JACK B. PETERSON
INVENTOR

BY
BUCKHORN, BLORE, KLARQUIST & SPARKMAN
ATTORNEYS

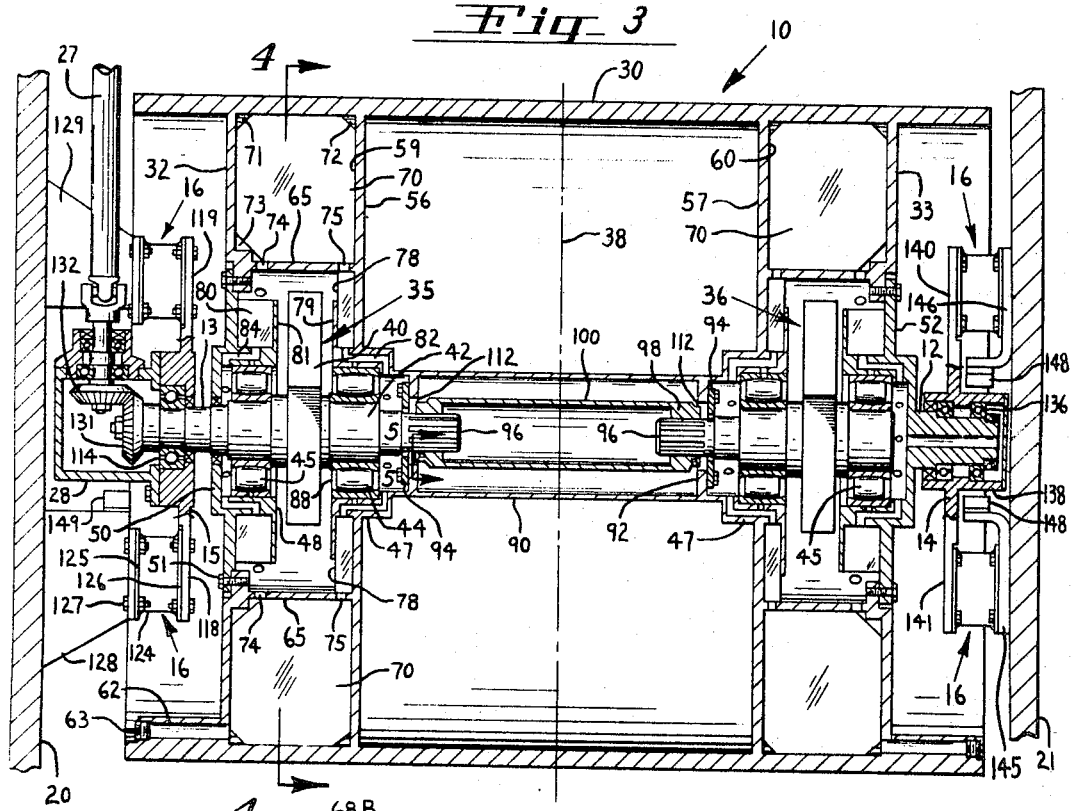
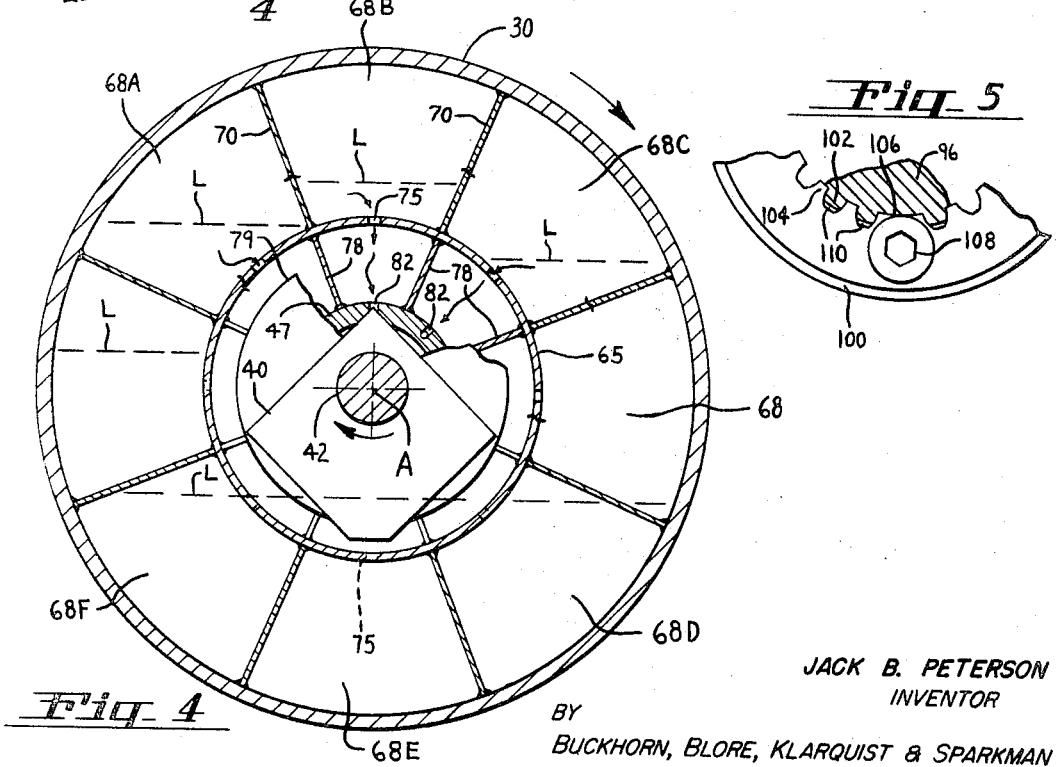

United States Patent Office 3,437,019
Patented Apr. 8, 1969

3,437,019
VIBRATORY COMPACTOR
Jack B. Peterson, Portland, Oreg., assignor to Hyster Company, Portland, Oreg., a corporation of Nevada
Filed May 31, 1967, Ser. No. 642,586
Int. Cl. E01c *19/28, 19/26*
U.S. Cl. 94—50     21 Claims

ABSTRACT OF THE DISCLOSURE

This application discloses a vibratory compactor having a hollow earth-compacting drum roller supporting a towed frame. Two separate eccentric weights are separately journaled in supporting bearing assemblies near opposite ends of the drum for rotation about the axis of the drum. An engine on the frame drives one of the eccentric weights through an external drive train. Rotary motion is transmitted through such eccentric weight to the other eccentric weight by a splined sleeve which interconnects the shafts of the two weights to act as a synchronizer as well as a drive link.

The eccentric weights and their supporting bearings are housed within separate oil reservoirs confined to the opposite ends of the drum. Each reservoir has a system of radial vanes which rotate with the drum to lift oil above the bearings, after which the oil flows by gravity downwardly through the bearing assemblies and into the lower regions of the reservoir. The eccentric weights serve as auxiliary lubricating means when they rotate by splashing the bearings with oil.

Vibrations transmitted to the drum by the eccentrics are isolated from the compactor frame and drive components by elastomer blocks which are bonded to rigid elements fastened to the frame and drum.

BACKGROUND OF THE INVENTION

Field of the invention

The present invention relates to compaction equipment and more particularly to a vibratory compactor of the roller type.

Description of the prior art

Most vibratory compactors use a single rotary eccentric shaft within the roller drum to produce vibrations as shown, for example, in U.S. patents, Nos. 3,257,918 to Garis and 2,671,386 to Kerridge. Two widely separated bearing assemblies support the single shaft at opposite ends of the drum, and thus the dynamic forces developed by rotation of the shaft induce high bending stresses in the shaft and accelerate bearing wear. Moreover, the entire eccentric shaft assembly must be removed to replace bearings or perform other maintenance within the drum.

Furthermore, the two widely spaced bearing assemblies are usually supplied with oil from a common reservoir, as shown, for example, in the aforementioned Garis patent. The disadvantage of such an arrangement is that the flow of oil to one of the bearing assemblies is seriously impaired when the roller is tilted as when operating on a sidehill. Lubrication systems for such bearings quite commonly utilize elements which rotate with the eccentric shaft to splash oil onto the bearings. However, such a system usually supplies less than an optimum flow of oil to the bearings and is necessarily dependent on rotation of the eccentric shaft.

SUMMARY OF THE INVENTION

The aforementioned problems of the prior art are overcome by providing a pair of axially separated eccentric weight members in place of the usual single eccentric shaft within the drum, with the eccentric weights having separate stub shafts, each individually journaled in bearings positioned on both sides of and closely adjacent to the eccentric weight itself to minimize bending stresses in the shaft. The eccentric shafts are drivingly interconnected by a splined sleeve which enables removal of one eccentric from the drum for replacement of bearings and the like while the other eccentric remains in place within the drum. A separate oil reservoir surrounds each eccentric and its supporting bearings and is constructed and arranged so that oil remains available to all bearings while the drum is operating on an incline. Special oil-lifting vanes provided within each reservoir lift oil above the bearings as the drum rotates so that oil in ample quantity flows continuously by gravity through the bearing assemblies. The eccentrics supplement the vanes by splashing oil onto the bearings so that they are lubricated when the drum is stationary.

Principal objects of the present invention are to provide:

(1) A vibratory compacting roller having an unusually high dynamic exciting force while also providing excellent life expectancy for all drive components, eccentric shafts, bearings and isolator elements;

(2) An improved eccentric-type vibrations generator for a compaction roller, utilizing multiple eccentric weights;

(3) An improved bearing support system for an eccentric-type vibrations generator of a vibratory compactor;

(4) An improved system for lubricating and cooling the bearings supporting an eccentric-type vibrations generator in a vibratory compaction roller;

(5) An improved mounting and drive for the aforesaid multiple eccentrics in a vibratory compactor which provide for synchronous operation of the several eccentrics and simplified maintenance of components within the roller drum;

(6) An improved means for isolating the drum from the frame and drive components of a vibratory compactor; and (7) A vibratory compaction roller which is simplified and economical in construction, maintenance and operation.

BRIEF DESCRIPTION OF THE DRAWINGS

The foregoing and other objects and advantages of the invention will become more apparent from the following detailed description which proceeds with reference to the accompanying drawings wherein:

FIG. 3 is a horizontal sectional view taken along the line 3—3 of FIG. 1, showing the details of the compaction drum on an enlarged scale;

FIG. 4 is a vertical sectional view taken along the line 4—4 of FIG. 3 with a central portion of the drum broken away for clarity of illustration; and FIG. 5 is a fragmentary vertical sectional view taken along the line 5—5 of FIG. 3 on a scale enlarged from that of FIG. 3.

DETAILED DESCRIPTION

General arrangement

Figure 1:
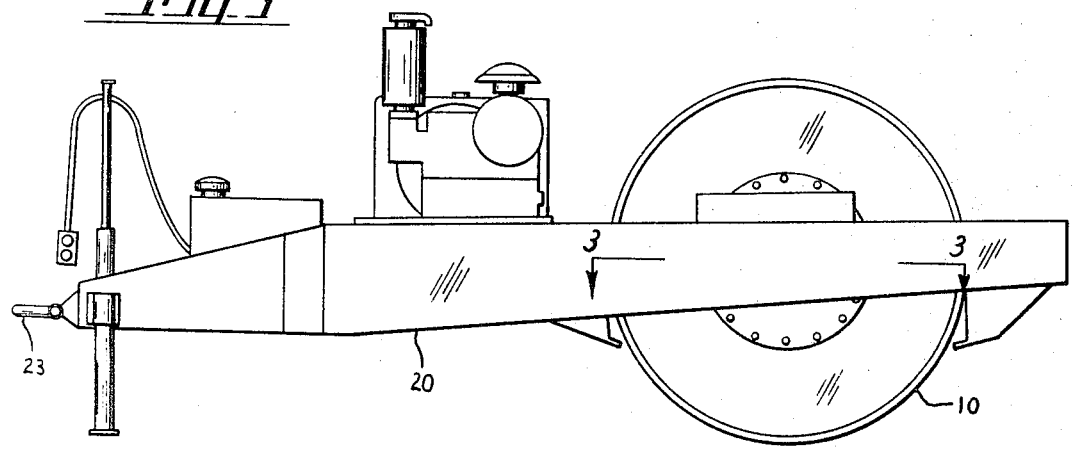
FIG. 1 is a side elevational view of a vibratory compactor in accordance with the present invention.
Figure 2:
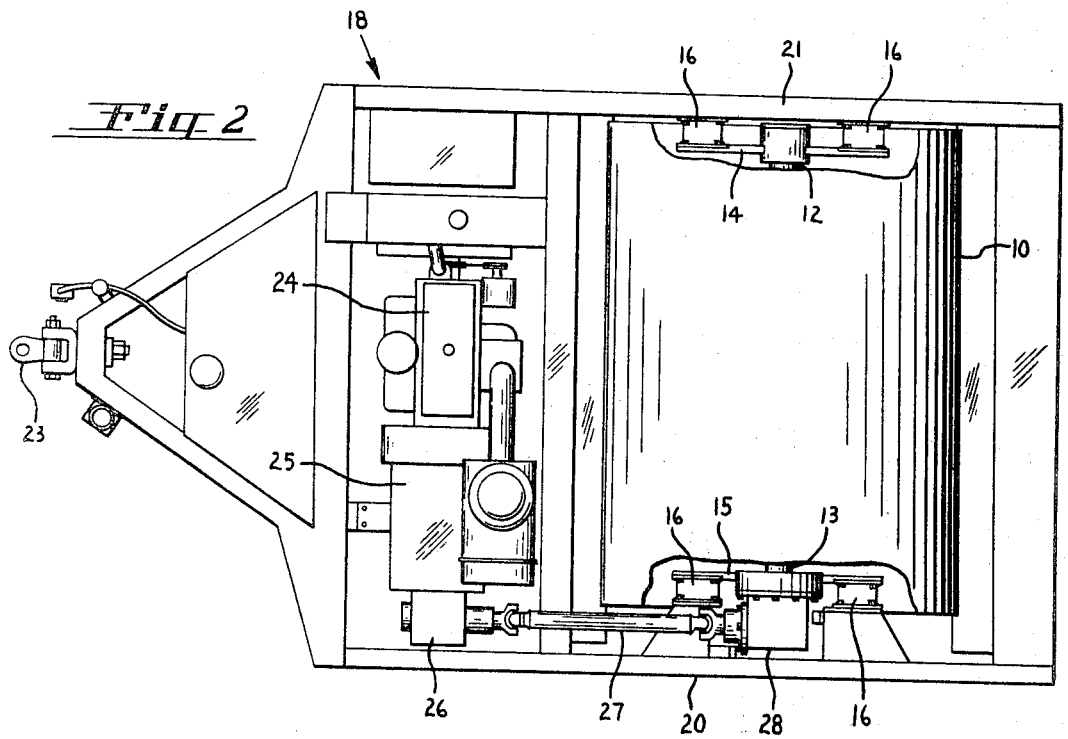
FIG. 2 is a top plan view of the compactor of FIG. 1.

Referring to FIGS. 1 and 2, a hollow cylindrical compaction wheel or drum 10 is in contact with the ground surface and supports through the medium of shaft ends 12, 13 projecting from the opposite ends of the drum, connector members 14, 15 and isolators 16, a frame 18 having longitudinal side frame members 20 and 21. The frame is towed by a tractor vehicle (not shown) connected to the front end of the frame at a trailer hitch connection 23. Frame 18 mounts an internal combustion engine 24 which transmits rotary power through drive train components 25, 26, 27 and 28 to a rotary eccentric weight means within the drum which serves as a vibrations generator.

Eccentric weight means and mounting

Referring now to the more detailed views of FIGS. 3 and 4, the drum includes an outer cylindrical shell 30, the opposite ends of which are at least partially enclosed by end walls 32, 33 inwardly of the opposite ends of the shell.

The eccentric weight means includes a pair of separate eccentric weight members 35, 36 journaled independently of one another on opposite sides of a vertical center plane 38 through the drum for rotation about the rotational axis of the drum. As shown best in FIG. 4, each eccentric weight member includes a generally rectangular eccentric mass portion 40 and a shaft portion 42 which projects from both sides of the eccentric mass portion. The shaft of each eccentric weight member is supported at points closely adjacent the opposite sides of eccentric mass 40 by a pair of spherical roller bearing assemblies 44, 45 to minimize bending stresses on the shaft and to prolong bearing life. These bearing assemblies are housed within bearing housings 47, 48 respectively.

The outside bearing housing 48 for the left hand eccentric of FIG. 3 forms part of a hub plate assembly 50 which is attached by fasteners 51 to end wall 32 to complete the closure of the adjacent end of the drum. The corresponding outside bearings 45 of the right hand eccentric of FIG. 3 are enclosed by a similar bearing housing which forms part of a spindle plate assembly 52 including a spindle shaft 54. This assembly is fastened to end wall 33 to enclose the other end of the drum. Thus it will be evident that the housing 48 for the outside bearings of the two eccentric weight members are carried by the drum through end walls 32 and 33.

Lubrication system

The bearing housings 47 for the inside bearings of the two eccentric weight members are joined to inner walls 56, 57, spaced inwardly of their adjacent end walls 32, 33 and extending parallel to such end walls. The inner walls, their associated end walls and connecting portions of the shell together define a pair of liquid lubricant reservoirs 59, 60 at opposite ends of the drum, each of which surrounds the adjacent eccentric weight member and its supporting bearing assemblies. Each reservoir carries its own supply of liquid lubricant, which is added to the reservoir through a filler pipe 62 at each end wall. A filler cap 63 closes the outer end of each pipe. Because of the narrow axial width of each reservoir, oil remains available to the bearings therewithin at all times and even when the drum is sharply tilted. The inner walls of each reservoir and their associated inner bearings housings prevent cross flow of lubricant between the reservoirs.

Each reservoir is separated into an outer portion and a central portion by an annular wall 65, which is concentric with shell 30. The resulting outer reservoir portion is partitioned into chambers 68 by a series of equally spaced apart radially extending oil-lifting vanes 70. Each vane has cutaway corners providing openings 71, 72, 73 which permit limited transfer of fluid between chambers, although these openings are not large enough to prevent the vanes from carrying out their lubricant-lifting functions.

Annular wall 65 is provided with oil passages 74, 75 at the opposite sides of each chamber 68 which permit the transfer of oil between the outer chambers and the central portion of the reservoir.

The central portion of each reservoir includes a series of radial guide vanes 78 along its inner wall and another series of somewhat wider radial guide vanes 80 along its outer wall. Both sets of these guide vanes are in radial alignment with the vanes 70 of the outer reservoir, as shown in FIG. 4, and are at least partially covered by plates 79, 81 carried by the bearing housings to provide collecting cups for receiving oil flowing from outer chambers 68 through passages 74 and 75. Oil received within these cups flows by gravity through oil passages 82, 84 in the inner and outer bearing housings, respectively, to the roller bearings. The oil continues to flow through each bearing structure and downwardly through passages 82, 84 in the lower portions of the bearing housings to the lower regions of the reservoir. In this manner, both sets of bearings within each reservoir are continuously lubricated and cooled with an ample flow of oil so long as the drum rotates.

The oil-lifting effect of vanes 70 is best shown in FIG. 4. As the drum revolves in a clockwise direction as indicated by the arrow, the rising vanes 70 on the left hand side of the drum lift lubricant at a level L within each chamber 68 to a level above both bearing housings 47, 48. When each chamber reaches the positions of chambers 68A, 68B and 68C, the lubricant within such chamber will flow by gravity into the central portion of the reservoir and bearing housings as previously described. At the same time, lubricant passes downwardly through the bearing housings and into the lower chambers 68D, 68E and 68F.

Although the vanes provide the primary source of lubricant for the bearings, the eccentrics themselves provide an auxiliary source, and the only source when the drum is at a standstill. Each eccentric mass 40, as it rotates about the axis A of the drum, dips into the oil within the lower portions of the reservoir and splashes it into the upper reaches of the central reservoir portion, from which the oil is collected within the cups formed by vanes 78 and 80. Some oil is also splashed directly into the bearings through side wall access openings 88 of each bearing housing. Naturally, for this splash system to work effectively, the oil within each reservoir must be maintained at a sufficiently high level to enable the eccentric weights to dip into the oil.

Although the lubrication system has been described with reference to the left hand eccentric of FIG. 3, the system and structure for the right hand eccentric is the same, and therefore need not be described further.

Eccentric drive

Referring to FIG. 3, inside bearing housing 47 for the left hand eccentric weight member is joined to the corresponding inside bearing housing for the right hand eccentric weight member by an outer tube 90 having inwardly extending annular flanges 92 at its opposite ends to which a pair of opposite end plates 94 are fastened. The shaft of each eccentric weight member has a splined inner end 96 of reduced diameter which projects through a central opening in the adjacent end plate 94 and axially into outer tube 90. The shaft ends 96 mate with the splined opposite ends 98 of a torque tube, or sleeve, 100, which thereby drivingly interconnects the two eccentric weight members.

Splined sleeve 100 also serves to synchronize the positions and movements of the two eccentric weights so that both will be in exactly the same relative positions at the same time to maximize their vibrational effects. In this regard, referring to FIG. 5, the shaft end 96 of each eccentric weight has splines 102 which fit within grooves between the splines 104 of sleeve 100 in interdigital fashion. However, shaft end 96 has one spline removed, at 106. The corresponding groove of the sleeve is blocked by a bolt and washer assembly 108 so that the sleeve can only be assembled on the shaft ends in one certain position of each. Furthermore, the corresponding spline of each shaft end is removed as determined by the positions of the eccentric weights. Thus, the shaft ends of the two eccentric weights can only be assembled in the corresponding ends of sleeve 100 when the weights 40 are in exactly the same position relative to one another.

From the foregoing it will be evident that power transmitted from the engine on the compactor frame to the one eccentric weight 35 through an external drive train, including drive shaft 27, is transmitted to the other eccentric weight through the splined sleeve 100. The splined sleeve and separate bearing support for each eccentric greatly simplify maintenance and replacement of bearings in that one eccentric weight and its supporting parts can be removed from one end of the drum without disturbing the other eccentric assembly at the opposite end of the drum.

It will be noted from FIG. 5 that there is a slight clearance 110 provided between the splines of one of the two interfitting members and the grooves of the other member, so that a limited amount of axial misalignment can exist between the two eccentric weight members and still permit assembly of the shaft ends of the eccentric weight members in the splined sleeve. This clearance also provides a certain amount of flexibility when the eccentric weights are rotating so that torque can be transmitted from one eccentric weight member to the other without inducing any other substantial stresses in the three interconnected elements.

Although the two oil reservoirs are isolated and substantially sealed from one another so that there is no crossflow of fluid between reservoirs, there is a limited and controlled amount of leakage permitted from the reservoirs through the inside bearing housing passages 82 and through clearance spaces 112 provided between tube end plates 94 and shaft ends 96 to lubricate the splined connections between the shaft ends and the sleeve 100.

*Drum mounting*

With reference to FIG. 3, the opposite ends of the drum necessarily differ slightly from one another in construction because of the drive connection at the left end of the drum which is not needed at the opposite end, and therefore the mounting of these ends to their associated longitudinal side frame members 20 and 21 respectively differs slightly from one another.

Referring first to the left end of the drum of FIG. 3, shaft 42 of eccentric weight member 35 includes a shaft end extension 13 of reduced diameter. Shaft extension 13 projects outwardly beyond end wall 32 of the drum and is journaled in a ball bearing assembly 114 carried by the rigid connector member 15. Connector member 15 has arm-like flanges 118, 119 which extend horizontally in opposite directions from a central hub portion thereof. A pair of isolators 16 are bolted one to each of these arms. Each of these isolators includes a block-like elastomer body portion 124 which is sandwiched between and bonded to a pair of rigid mounting plates 125, 126. These plates have edge portions which extend outwardly beyond the outer peripheral limits of the elastomer body. The peripheral edge portions of the mounting plates have bolt holes therethrough which receive bolts 127 for fastening one plate 126 to one of the arms 118, 119 of the connector member and the other plate 125 to one of two mounting blocks 128, 129 rigidly affixed to the longitudinal side frame member 20. In this manner, the two elastomer isolator bodies are interposed between and interconnected to the frame and drum without any of the fasteners penetrating the isolator body. This feature has been found to prolong isolator life considerably as compared to prior arrangements.

The central hub portion of connector member 15 also has bolted to it gear box 28 of the drive train. The outermost end of eccentric shaft extension 13 carries a bevel gear 131 within the gear box which meshes with another bevel gear 132 fixed to the adjacent end of drive shaft 27.

Since there is no external drive connection between the right hand eccentric weight member 36 and the engine, the shaft 42 of such weight member terminates at the outer spherical bearing assembly 45. The housing for such bearing assembly forms part of the spindle shaft assembly 52. Spindle shaft 54 of this assembly is journaled in roller bearings 136 housed within the hub portion 138 of the connector member 14. Connector member 14 has horizontally extending arms 140, 141 to which a pair of isolators 16 of the type previously described are fastened. These isolators are also connected to frame plates 145, 146 which are attached to the longitudinal side frame member 21. The frame plates have inturned ends which mount elastomer stops 148 to limit longitudinal movements of the drum relative to the frame. A similar stop 149 on mounting block 128 at the opposite end of the drum serves the same purpose.

Having illustrated and described a preferred embodiment of my invention, it should be apparent to those skilled in the art that the same permits of modification in arrangement and detail. I claim as my invention all such modifications as come within the true spirit and scope of the following claims:

1. A vibratory compaction roller having a compaction drum, eccentric weight means within said drum having a center of gravity offset from the rotational axis of said drum, and drive means for rotating said eccentric weight means about said drum axis independently of the rotation of said drum, said eccentric weight means including a pair of axially spaced apart eccentric weight members disposed on opposite sides of a vertical center plane through said drum, each said weight member being journaled independently of the other in separate bearing means for rotation about said drum axis, said bearing means for each eccentric weight member including a pair of bearing members positioned one on each of the axially opposite sides of the eccentric portion of said weight member closely adjacent said eccentric portion, said drum including support means for each eccentric weight member including means on each of the axially opposite sides of each weight member for transmitting eccentric-induced forces radially from each said bearing member to a peripheral portion of said drum, said drive means including power transmission means drivingly connected to said eccentric weight members for rotating the same in unison.

2. Apparatus according to claim 1 wherein each of said eccentric weight members includes a rotatable shaft portion coaxial with the axis of said drum and journaled in said pair of bearing members.

3. A vibratory compaction roller having a compaction drum, eccentric weight means within said drum having a center of gravity offset from the rotational axis of said drum, and drive means for rotating said eccentric weight means about said drum axis independently of the rotation of said drum, said eccentric weight means including a pair of axially spaced apart eccentric weight members disposed on opposite sides of a vertical center plane through said drum, each said weight member being journaled independently of the other in separate bearing means for rotation about said drum axis, said drive means including power transmission means drivingly connected to said eccentric weight members for rotating the same in unison, said power transmission means including first means extending from a source of power to one of said eccentric weight members for rotating the same, and second means extending between and drivingly interconnecting said eccentric weight members within said drum, said second means being removably connected to each of said weight members, and said weight members being removable from within said drum through opposite ends thereof so that removal of one of said weight members from said drum can be effected without disturbing the other of said weight members.

4. Apparatus according to claim 3 wherein said second means prevents relative rotation between said weight members and thereby synchronizes the rotational movement of said weight members.

5. Apparatus according to claim 3, including means defining a pair of lubricant reservoirs within said drum, each surrounding a different one of said bearing means and being in communication with the associated said bearing means, said lubricant reservoirs being axially separated and substantially sealed from one another, and means providing communication between at least one of said lubricant reservoirs and said second means at locations where said second means is removably connected to each of said weight members.

6. Apparatus according to claim 3 wherein said second means is flexibly connected to each of said eccentric weight members so as to permit a limited amount of axial weight misalignment between said eccentric weight members without adversely affecting the driving interconnection between said eccentric weight members.

7. A vibratory compaction roller having a compaction drum, eccentric weight means within said drum having a center of gravity offset from the rotational axis of said drum, and drive means for rotating said eccentric weight means about said drum axis independently of the rotation of said drum, said eccentric weight means including a pair of axially spaced apart eccentric weight members disposed on opposite sides of a vertical center plane through said drum, each said weight member being journaled independently of the other in separate bearing means for rotation about said drum axis, said drive means including power transmission means drivingly connected to said eccentric weight members for rotating the same in unison, each said eccentric weight member including an enlarged central eccentric mass portion and a shaft portion extending in opposite directions from said central mass portion, said bearing means for each said weight member including a pair of separate bearing members journaling said shaft portion at positions closely adjacent to and on opposite sides of said central eccentric mass portion, whereby said shaft portion is relieved of any substantial bending stresses, said shaft portion for each eccentric weight member having opposite inner and outer end portions extending beyond said bearing members, and means drivingly interconnecting said pair of eccentric weight members including an elongate tubular sleeve having splines at its opposite ends interengaging mating splines on the inner ends of the shaft portions of said pair of eccentric weight members.

8. Apparatus according to claim 7 wherein said splines have access to lubricant at said opposite ends of said sleeve and wherein there is sufficient clearance between the splines in said sleeve and the splines in said shaft portions to allow passage of lubricant throughout the length of said splines.

9. Apparatus according to claim 8 wherein said spline clearance is sufficient to tolerate moderate axial misalignment of said shaft portions.

10. A vibratory compaction roller comprising:

a compaction drum, eccentric weight means within said drum having a center of gravity offset from the rotation axis of said drum, axially spaced apart bearing means situated on opposite sides of a center plane through said drum for journaling said eccentric weight means, means defining a pair of liquid lubricant reservoirs within said drum, each said lubricant reservoir surrounding a different one of said bearing means and being in communication with the associated said bearing means, said lubricant reservoirs being axially separated from one another and sealed to inhibit the crossflow of lubricant from one reservoir to the other, each said lubricant reservoir having a radial extent greater than the radial extent of said bearing means and being confined in axial extent to the region of the associated bearing means so that liquid lubricant within each said reservoir remains in the region of and available to the associated said bearing means upon tilting movement of said drum from a horizontal disposition.

11. Apparatus according to claim 10 including a plurality of lubricant lifting vanes spaced apart circumferentially within each said reservoir and extending inwardly toward the center of the associated reservoir from the outer periphery thereof, said vanes being rotatable with said drum so that upon rotation of said drum fluid lubricant within each said reservoir will be lifted by said vanes to a level above the associated said bearing means and thereafter flow by gravity toward said bearing means.

12. Apparatus according to claim 10 wherein each said reservoir surrounds an associated said eccentric weight member as well as the bearing means therefor and wherein there is a fluid lubricant within said reservoir at a level such that the eccentric weight member dips into said lubricant upon rotation of said member whereby said eccentric weight member splashes lubricant into said bearing means to lubricate the same when said drum is not rotating.

13. Apparatus according to claim 11 wherein said bearing means for each eccentric weight member includes means rotatable with said drum defining a bearing housing within a central portion of said lubricant reservoir, and a plurality of circumferentially spaced apart lubricant passage means interconnecting the interior of said bearing housing and the surrounding portions of said lubricant reservoir so that upon rotation of said drum lubricant flows by gravity from an upper portion of said reservoir through an upwardly directed one of said passage means into said bearing housing and thence out of said bearing housing through a downwardly directed one of said passage means into a lower portion of said reservoir.

14. Apparatus according to claim 13 wherein said lubricant passage means includes at least one lubricant passage positioned between each adacent pair of said vanes.

15. Apparatus according to claim 11 including an annular wall within each said reservoir separating a radially outer portion of said reservoir housing said vanes from a central portion of said reservoir housing said eccentric weight member and the associated said bearing means, said annular wall being disposed closely adjacent the radially inner ends of said vanes and including passage means therethrough interconnecting the outer and central portions of said reservoir so that upon rotation of said drum, fluid within said outer portion of said reservoir will be lifted by said vanes to a level above said bearing means before flowing by gravity through said passage means into said bearing means.

16. Apparatus according to claim 10 including a plurality of lubricant lifting vanes spaced apart circumferentially within each said reservoir and extending inwardly toward the center of the associated reservoir from the outer periphery thereof, said vanes being rotatable with said drum so that upon rotation of said drum fluid lubricant within each said reservoir will be lifted by said vanes to a level above the associated said bearing means and thereafter flow by gravity toward said bearing means.

17. Apparatus according to claim 16 wherein each said bearing means includes means defining a bearing housing rotatable with said drum, said housing being positioned within a radially central portion of the surrounding said lubricant reservoir, and a plurality of circumferentially spaced apart lubricant passage means interconnecting the interior of said bearing housing and the surrounding portions of said lubricant reservoir so that upon rotation of said drum lubricant flows by gravity from an upper portion of said reservoir through an upwardly directed one of said passage means into said bearing housing and thence out of said bearing housing through a downwardly directed one of said passage means into a lower portion of said reservoir.

18. Apparatus according to claim 17 wherein said lubricant passage means includes at least one lubricant passage positioned between each adjacent pair of said vanes.

19. Apparatus according to claim 16 including an annular wall within each reservoir separating a radially outer portion of said reservoir containing said vanes from a central portion of the same said reservoir containing one of said bearing means, said annular wall being disposed closely adjacent the radially inner ends of said vanes and including passage means therethrough interconnecting the outer and central portions of said reservoir so that upon rotation of said drum, fluid within said outer portion of said reservoir will be lifted by said vanes to a level above said bearing means before flowing by gravity through said passage means into said bearing means.

20. Apparatus according to claim 19 wherein said vanes extend from the outer periphery of said drum to positions adjacent said annular wall and from side to side of said reservoir, and additional vane means forming radial extensions of said first-mentioned vanes within the central portion of said reservoir so as to guide lubricant flowing into said central portion to said bearing means.

21. A vibratory compaction roller having a compaction drum, eccentric weight means within said drum having a center of gravity offset from the rotational axis of said drum, and drive means for rotating said eccentric weight means about said drum axis independently of the rotation of said drum, said eccentric weight means including a pair of axially spaced apart eccentric weight members disposed on opposite sides of a vertical center plane through said drum, each said weight member being journaled independently of the other in separate bearing means for rotation about said drum axis, said drive means including power transmission means drivingly connected to said eccentric weight members for rotating the same in unison, frame means, including a pair of laterally opposed longitudinal side frame members, said drum being disposed endwise between said longitudinal side frame members, shaft means supported by said drum and projecting coaxially from opposite ends thereof toward said side frame members, connecting means connecting said shaft means to said side frame members including bearing means journaling said shaft means so as to permit relative rotation between said shaft means and said frame, said connecting means including a rigid connector member supporting said bearing means at one end of said drum in spaced relation to the adjacent said side frame member at the same end of said drum, said connector member including a flange portion extending in opposite directions from the supported said bearing means and generally parallel to the adjacent said side frame member, a pair of isolator means disposed between said flange portion and the adjacent said side frame member on opposite sides of the supported said bearing means, each of said isolator means including a pair of abutment plates, and an elastomer member extending between said abutment plates and bonded thereto for transmitting tractive forces between said frame and said drum while isolating vibrations of said drum from said frame, said abutment plates including flange portions extending laterally beyond the outer limits of said elastomer member and fasteners extending through said flange portions and connecting said portions to the flange portion of said connector member and the adjacent said side frame member so that said fasteners do not protrude into said elastomer member.

References Cited

UNITED STATES PATENTS

| | | | |
|---|---|---|---|
| 2,812,696 | 11/1957 | Henry | 94—48 |
| 2,868,094 | 1/1959 | Andersson | 94—48 |
| 3,052,166 | 9/1962 | Thrun | 94—48 |
| 3,108,519 | 10/1963 | Domenighetti | 94—50 |
| 3,257,918 | 6/1966 | Garis | 94—50 |
| 3,318,210 | 5/1967 | Schwamborn | 94—50 |

FOREIGN PATENTS 767,968  2/1957  Great Britain.

NILE C. BYERS, JR., *Primary Examiner.*